US009282456B2

(12) United States Patent
Gupta

(10) Patent No.: US 9,282,456 B2
(45) Date of Patent: Mar. 8, 2016

(54) TECHNIQUES FOR ROAMING BETWEEN HETEROGENEOUS WIRELESS NETWORKS

(71) Applicant: Intel Corporation, Santa Clara, CA (US)

(72) Inventor: Vivek Gupta, Milpitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 253 days.

(21) Appl. No.: 13/691,215

(22) Filed: Nov. 30, 2012

(65) Prior Publication Data

US 2014/0153555 A1 Jun. 5, 2014

(51) Int. Cl.
H04W 4/00 (2009.01)
H04W 12/06 (2009.01)
H04L 29/06 (2006.01)
H04W 8/12 (2009.01)
H04W 84/12 (2009.01)

(52) U.S. Cl.
CPC ............. *H04W 12/06* (2013.01); *H04L 63/205* (2013.01); *H04W 8/12* (2013.01); *H04W 84/12* (2013.01)

(58) Field of Classification Search
CPC ........ H04W 12/06; H04W 92/02; H04W 8/02
USPC .............................................. 370/338; 726/21
See application file for complete search history.

(56) References Cited

U.S. PATENT DOCUMENTS

| 7,724,700 | B1 * | 5/2010 | Grayson et al. ............... 370/328 |
| 7,929,528 | B2 | 4/2011 | Henry et al. |
| 8,566,926 | B1 * | 10/2013 | Schnellbacher et al. ........ 726/21 |
| 2002/0136226 | A1 | 9/2002 | Christoffel et al. |
| 2004/0198220 | A1 | 10/2004 | Whelan et al. |
| 2005/0177733 | A1 | 8/2005 | Stadelmann et al. |
| 2010/0304737 | A1 * | 12/2010 | Jain et al. .................... 455/426.1 |
| 2012/0033639 | A1 * | 2/2012 | Li ........................ H04L 63/0892 370/331 |
| 2012/0054840 | A1 * | 3/2012 | Gupta ..................... H04L 63/08 726/5 |
| 2012/0278440 | A1 * | 11/2012 | Iyer ............................... 709/219 |

OTHER PUBLICATIONS

Farooq Bari et al., GSM Association wireless Broadband Alliance, Wi-Fi Roaming whitepaper, version 1.0, Dec. 2, 2011.*

(Continued)

*Primary Examiner* — Andrew Chriss
*Assistant Examiner* — Romani Ohri
(74) *Attorney, Agent, or Firm* — Kacvinsky Daisak Bluni PLLC

(57) ABSTRACT

Examples are disclosed for roaming between heterogeneous wireless networks. In some examples, an authorization request for user equipment (UE) to access a visited wireless local area network (WLAN) may be received via a first protocol. The authorization request may be interworked by an authentication, authorization and accounting (AAA) interworking function (AIF) to enable the UE to be authenticated and authorized for access to the visited WLAN via information exchanged between a visited AAA server and a home AAA server. The visited home AAA server may be associated with different types of wireless networks to include wireless wide area networks (WWANs) or with a different WLAN. Interworking by the AIF may include translating the authentication request received via the first protocol to a second protocol to allow for the exchange of information between the visited AAA server and the home AAA server. Other examples are described and claimed.

24 Claims, 10 Drawing Sheets

(56) References Cited

OTHER PUBLICATIONS

"Wi-Fi Roaming Whitepaper" Version 1.0, GSM Association—Wireless Broadband Alliance (WBA), Dec. 2, 2011, 86 pages.

International Search Report and Written Opinion received for PCT Patent Application No. PCT/US2013/047461, mailed Oct. 18, 2013, 14 pages.

* cited by examiner

1100

```
┌─────────────────────────────────────────────┐
│ RECEIVE AN AUTHORIZATION REQUEST FOR AN UE TO│
│ ACCESS A VISITED WLAN, THE AUTHORIZATION REQUEST│
│ RECEIVED USING A FIRST RADIUS PROTOCOL FOR A WRIX-i│
│            OR IR.61 INTERFACE                │
│                   1102                       │
└─────────────────────────────────────────────┘
                     │
┌─────────────────────────────────────────────┐
│ INTERWORK THE AUTHORIZATION REQUEST FOR THE UE TO│
│  ACCESS THE VISITED WLAN VIA AN AIF, INTERWORKING│
│  VIA THE AIF TO AUTHENTICATE AND AUTHORIZE THE UE│
│   FOR ACCESS TO THE VISITED WLAN VIA INFORMATION│
│       RECEIVED FROM A VISITED AAA SERVER AND │
│   INFORMATION RECEIVED FROM A HOME AAA SERVER│
│                   1104                       │
└─────────────────────────────────────────────┘
                     │
┌─────────────────────────────────────────────┐
│ FORWARD THE AUTHORIZATION REQUEST TO THE VISITED│
│   AAA SERVER OR FORWARD AN AUTHENTICATION    │
│         REQUEST TO THE HOME AAA SERVER       │
│                   1106                       │
└─────────────────────────────────────────────┘
```

*FIG. 11*

Storage Medium *1200*

Computer Executable
Instructions for 1100

TECHNIQUES FOR ROAMING BETWEEN HETEROGENEOUS WIRELESS NETWORKS

BACKGROUND

In recent years broadband wireless networks have seen an explosion in the amount of data traffic associated with wireless devices or user equipment (UEs) accessing these networks. Cellular-based wireless networks associated with one or more third generation (3G) or fourth generation (4G) wireless standards promulgated by organizations or standards bodies such as the $3^{rd}$ Generation Partnership Project (3GPP) have become common. Also, UEs coupling to either 3G 3GPP and/or 4G 3GPP wireless networks are now often enabled with a dual mode capability to not only couple to a cellular-based wireless network but also to a wireless local area network (WLAN) using wireless technologies such as Wi-Fi™.

Service providers for UEs having dual mode capabilities may find advantages in enabling subscriber UEs to access Wi-Fi access networks operated by other service providers in order to reduce data traffic loads over their cellular-based (e.g., 3G/4G 3GPP) wireless networks. Even service providers serving UEs that lack cellular capabilities but have Wi-Fi capabilities may find advantages to enabling users to roam to an increased number of other Wi-Fi access networks. Roaming may require some interworking between possibly different technologies associated with the different types of service providers servicing UEs having single or dual mode capabilities. It is with respect to these and other considerations that the examples described herein are needed.

BRIEF DESCRIPTION OF THE DRAWINGS

FIG. 11 illustrates an example of a logic flow.
FIG. 12 illustrates an example of a storage medium.

DETAILED DESCRIPTION

Figure 1:
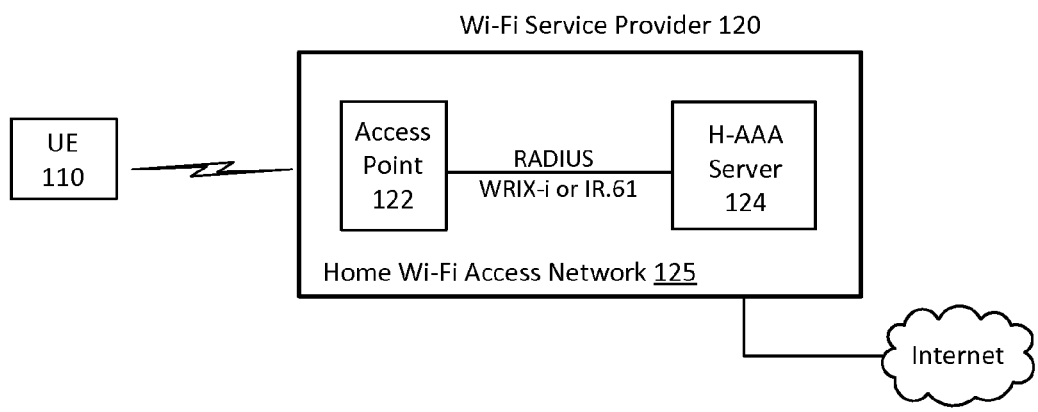
FIG. 1 illustrates an example of a first home system.

Examples are generally directed to improvements for roaming access for user equipment (UE) to wireless local area networks (WLANs) such as Wi-Fi access networks operated by different types of service providers associated with wireless mobile telecommunication cellular or wireless mobile broadband technologies. These wireless technologies may include technologies suitable for use with wireless devices or UEs capable of coupling to Wi-Fi access networks operated by different types of service providers that may use different credential schemes to authorize or authenticate UEs for access to a Wi-Fi access network. The different types of credential schemes may include those based on subscriber identity module (SIM) or universal SIM (USIM) credentials or those based on username/password credentials, to name just a few.

The different types of service providers may operate respective Wi-Fi access networks in compliance with various WLAN standards promulgated by the Institute of Electrical Engineers (IEEE). These WLAN standards may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11") or IEEE Standard for Local and metropolitan area networks—Port-Based Network Access Control—802.1x-2010, published February 2010, and/or later versions of this standard ("IEEE 802.1X").

The different types of service providers may also implement wireless mobile broadband technologies that may include any wireless technologies suitable for use with wireless devices or UEs, such as one or more 3G or 4G wireless standards, revisions, progeny and variants. Examples of wireless mobile broadband technologies may include without limitation any of the Institute of Electrical and Electronics Engineers (IEEE) 802.16m and 802.16p standards, 3GPP Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP before Release 8 ("3G 3GPP") or Release 8 and above ("4G 3GPP") of LTE/System Architecture Evolution (SAE), and so forth. The examples are not limited in this context.

By way of example and not limitation, various examples may be described with specific reference to various 3GPP LTE and LTE-A standards, such as the 3GPP LTE Evolved UMTS Terrestrial Radio Access Network (E-UTRAN), Universal Terrestrial Radio Access (E-UTRA) and LTE-A Radio Technology 36 Series of Technical Specifications (collectively "3GPP LTE Specifications"), IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless MAN-Advanced Air Interface for Broadband Wireless Access Systems, Enhancements to Support Machine-to-Machine Applications" (collectively "IEEE 802.16 Standards"), IEEE 802.11 standards such as IEEE 802.11-2012 or IEEE 802.11 standards such as IEEE 802.1x and any drafts, revisions or variants of the 3GPP LTE Specifications or the IEEE 802.16, 802.11 or 802.1x Standards. Although some embodiments may be described as a 3GPP LTE Specifications or IEEE 802.16, 802.11 or 802.1x Standards system by way of example and not limitation, it may be appreciated that other types of communications system may be implemented as various other types of mobile broadband communications systems and standards. The examples are not limited in this context.

As contemplated in the present disclosure, service providers for UEs having dual mode capabilities may find advantages in enabling subscriber UEs to access WLANs or Wi-Fi access networks operated by other service providers in order to lessen data traffic loads over their cellular-based (e.g., 3G/4G 3GPP) wireless networks. Service providers for cellular-based wireless networks typically use SIM/USIM credentials to authorize and authenticate a UE for access to their respective networks. However, some service providers may provide services to UEs that may not have SIM/USIM capabilities and thus may rely on password/username credential schemes for authorizing and authenticating a UE for access to their respective Wi-Fi access networks.

According to some examples, the different types of service providers may not only implement different credential schemes but back end authentication, authorization and accounting (AAA) servers used by the different types of service providers may not be able to interface at a level to allow roaming of UEs between home and visited Wi-Fi access networks operated by the different service providers. As a result of no interface between the AAA servers, a given service provider of a first type (e.g., Wi-Fi service provider) may not allow UEs served by another given service provider of a second type (e.g., 3G 3GPP or 4G 3GPP) to gain access to a Wi-Fi access network operated by the given service provider.

Interworking functionality (IWF) to allow for protocol interworking is needed to allow for roaming between Wi-Fi access networks operated by different types of service providers. The protocol interworking may be based on certain interfaces used to forward authorization and authentication requests between an access point for a visited Wi-Fi access network and AAA servers operated by both a service provider operating the visited Wi-Fi access network and a service provider operating a home (non-roaming) Wi-Fi access network. Interfaces utilized by these access points may be described in guidelines or standards put forth by organizations such as the Wireless Broadband Alliance (WBA) or the GSM Association (GSMA). For example, international roaming.61 (IR.61), "WLAN Roaming Guidelines (also known as Inter-Operator Handbook)", ver. 3.0.0, published April 2003 ("IR.61") or "Wireless roaming intermediary eXchange (WRIX), Interconnect", ver. 1.04, published March 2010 ("WRIX-i"). Access points arranged to use interfaces compliant with IR.61 or WRIX-i may further utilize a Remote Authentication in User Service (RADIUS) protocol to forward authorization requests to an AAA server. The RADIUS protocol is described in request for comments (RFC) 2865, "Remote Authentication Dial in User Service (RADIUS)", published June 2000. Most service providers that include Wi-Fi service provider types (e.g., providing services to UEs having only Wi-Fi capabilities) implement IR.61 or WRIX-i interfaces and use the RADIUS protocol to communicate with AAA servers.

3G 3GPP service providers utilize interfaces at their AAA servers that may not be in alignment with interfaces compliant with IR.61 or WRIX-i. For example, 3G 3GPP service providers may utilize interfaces at their AAA servers compliant with a 3GPP technical specification (TS) to include 3GPP TS 29.234. In these examples, even though 3GPP TS 29.234 describes the use of the RADIUS protocol, possible lack of alignment with IR.61 or WRIX-i requires some interworking. As a result, a first RADIUS protocol from an access point would have to be interworked to a second RADIUS protocol to send an authentication request to the 3G 3GPP service provider's AAA server.

Currently, 4G 3GPP service providers also utilize interfaces at their AAA servers that are not in alignment with interfaces compliant with IR.61 or WRIX-i. For example, 4G 3GPP service providers may utilize interfaces at their AAA servers compliant with 3GPP TS to include 3GPP TS 29.273. In these examples, 3GPP TS 29.273 describes the use of a Diameter protocol that is touted as an advancement of the RADIUS protocol. Diameter is described in RFC 3588, "Diameter Base Protocol", published September 2003. Possible lack of alignment of TS 29.723 with IR.61 or WRIX-i plus the use of a different protocol requires some interworking. As a result, a RADIUS protocol from an access point may have to be interworked to a Diameter protocol to send an authentication to the 4G 3GPP service provider's AAA server. Also, since 4G 3GPP service provider use Diameter and 3G 3GPP service providers use RADIUS, some interworking may be needed to enable communications between 4G 3GPP AAA servers and 3G 3GPP AAA servers as well.

As mentioned above, Wi-Fi service providers typically utilize IR.61 or WRIX-i interfaces and the RADIUS protocol and although 3G 3GPP service providers may use the RADIUS protocol, an interface compliant with 3GPP TS 29.234 may not align with IR.61 or WRIX-i. Further, 4G 3GPP service providers use a different protocol than RADIUS and also an interface compliant with 3GPP TS 29.273 that also does not align with IR.61 or WRIX-i. All of the above mentioned non-alignments or different protocols may require some interworking. Currently an interworking solution has not been implemented. It is with respect to these and other challenges that the examples described herein are needed.

In some examples, techniques are implemented for roaming heterogeneous wireless networks or between Wi-Fi access networks operated by different types of service providers. These techniques may include receiving, at a computing device, a request for authorization of a UE to access a visited Wi-Fi access network or WLAN. The request for authorization of the UE to access the visited WLAN may be interworked (e.g., translated) via an AAA interworking function (AIF). Interworking via the AIF may authenticate and authorize the UE for access to the visited WLAN via information received from a visited AAA server and received from a home AAA server. For these examples, the visited AAA server may be associated with the visited WLAN and the home AAA server may be associated with a wireless wide area network (WWAN). The interworked request for authorization may then be forwarded to the visited AAA server. According to some examples, the AIF may interwork subsequent communications between the visited AAA server, the home AAA server or the access point to eventually grant or deny access of the UE to the visited WLAN or Wi-Fi access network.

FIG. 1 illustrates an example of a first home system. As shown in FIG. 1, the first home system includes home system 100. In some examples, as shown in FIG. 1, home system 100 includes a UE 110 wirelessly coupled to home Wi-Fi access network 125 operated by a Wi-Fi service provider 120. For these examples, as shown in FIG. 1, home Wi-Fi access network 125 includes an access point 122 coupled to a home AAA (H-AAA) server 124.

According to some examples, Wi-Fi service provider 120 may be a type of service provider or network system that primarily provides Internet access to wireless devices or UEs via Wi-Fi connections (e.g., wireless Internet service provider (WISP) or multi-system operator (MSO)). In other words, UEs such as UE 110 may either lack circuitry to couple to a cellular-based wireless network or have not enabled or activated this type of circuitry for access to the Internet. These types of UEs may include, but are not limited to, desktop computers, laptop computers, netbook computers, ultrabook computers, tablets, game consoles, music players, video players, smart TVs, set top boxes, etc. that either lack the circuitry or have not established/paid for access to cellular-based wireless networks. However, these UEs may be capable of and/or may have established service agreements with Wi-Fi service provider 120 to gain access to the Internet through home Wi-Fi access network 125.

In some examples, in order to gain access to the Internet via home Wi-Fi access network 125, UE 110 may provide credentials that include a username and password. For these examples, access point 122 may be capable of forwarding the username and password received from UE 110 to H-AAA server 124 via a WRIX-i or IR.61 interface using a RADIUS protocol. H-AAA server 124 operated by Wi-Fi service provider 120 may then authorize and authenticate UE 110 for access to Wi-Fi access network 125 based on the established service agreement.

Figure 2:
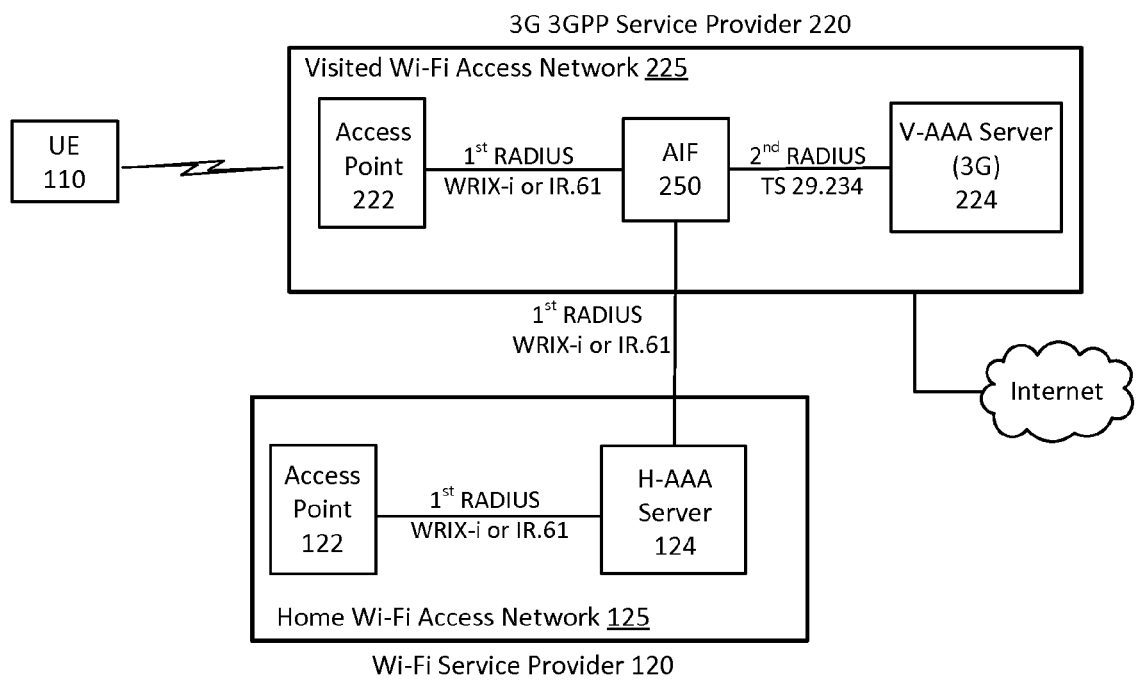
FIG. 2 illustrates an example of a first roaming system.

FIG. 2 illustrates an example of a first roaming system. As shown in FIG. 2, the first roaming system includes roaming system 200. In some examples, as shown in FIG. 2, roaming system 200 includes UE 110 wirelessly coupled to visited Wi-Fi access network 225 operated by 3G 3GPP service provider 220. For these examples, as shown in FIG. 2, visited Wi-Fi access network 225 includes an access point 222, an AAA interworking function (AIF) 250 and a visited AAA (V-AAA) server 224. Also shown in FIG. 2, is home Wi-Fi access network 125 operated by Wi-Fi service provider 120. In some examples, Wi-Fi access network 125 may be considered as a different WLAN and H-AAA 124 may be associated with that different WLAN.

According to some examples, 3G 3GPP service provider 220 may be a type of service provider or network system that in addition to operating visited Wi-Fi access network 225 may also operate cellular-based wireless networks in compliance with 3GPP specifications or standards that precede Release 8 and thus may be considered as a 3G 3GPP service provider. For these examples, V-AAA server 224 may be located at or with system equipment at a 3G evolved packet core (EPC). Hence, V-AAA 224 may be operated as a 3G visited AAA server. As a 3G visited AAA server, V-AAA 224 may have an interface operated in compliance with TS 29.234.

In some examples, UE 110 may send or transmit a request to access visited Wi-Fi access network 225 to access point 222. The request may include a username and a password. For these examples, access point 222 may include an IR.61 or a WRIX-i compliant interface and may forward the request towards V-AAA 224 as an authorization request using a first RADIUS protocol. IR.61 or WRIX-i use a RADIUS protocol described in RFC 2865. However, as mentioned above, V-AAA 224 uses an interface operated in compliance with TS 29.234. Therefore, AIF 250 may include logic and/or features to receive the authorization request sent using the first RADIUS protocol from access point 222 and then interwork or translate the authorization request to a second RADIUS protocol. The translated authorization request may then be forwarded by AIF 250 to V-AAA 224.

According to some examples, 3G 3GPP service provider 220 and Wi-Fi service provider 120 may have a previously established roaming agreement to allow users to roam and gain access to each other's Wi-Fi access networks. If an agreement has been previously established, V-AAA 224 may generate an authentication request to authenticate UE 110 with its home Wi-Fi access network 125 operated by Wi-Fi service provider 120. For these examples, the authentication request may be forwarded towards home AAA (H-AAA) server 124 using the second RADIUS protocol. AIF 250 may also include logic and/or features to receive the authentication request sent using the second RADIUS protocol and then interwork or translate the authentication request to the first RADIUS protocol. The translated authentication request may then be forwarded by AIF 250 to H-AAA 124.

In some examples, H-AAA 124 may generate authentication information that indicates whether UE 110 has a valid (e.g., active) service agreement with Wi-Fi service provider 120 (e.g., the user name and password belong to an authorized user). The authentication information may be forwarded towards V-AAA 224 using the first RADIUS protocol. For these examples, AIF 250 may include logic and/or features to receive the authentication information sent using the first RADIUS protocol and then interwork or translate the authentication information to the second RADIUS protocol. The translated authentication information may then be forwarded by AIF 250 to V-AAA 224.

According to some examples, V-AAA 224 may generate grant information based on the received authentication information that originated from H-AAA 124. The grant information may indicate whether UE 110 is to be granted access to visited Wi-Fi access network 225. V-AAA 224 may forward the grant information towards access point 222 using the second RADIUS protocol. For these examples, AIF 250 may include logic and/or features to receive the grant information sent using the second RADIUS protocol and then interwork or translate the grant information to the first RADIUS protocol. The translated grant information may then be forwarded by AIF 250 to access point 222. Access point 222 may then either grant or deny UE 110 access to visited Wi-Fi access network 225 based on the received grant information.

In some examples, during a period of time UE 110 is accessing visited Wi-Fi access network 225, AIF 250 may also interwork accounting information to be exchanged between visited AAA server 224 and home AAA server 124. This interworking may include similar translations as described above for authorizing and authenticating UE 110.

In some examples, as shown in FIG. 2, AIF 250 may be located or situated as part of visited Wi-Fi access network 225. As such AIF 250 may be located with system equipment or a computing device managed or operated by 3G 3GPP service provider 220. According to some examples, AIF 250 may be located with or supported by the same system equipment or computing device that supports V-AAA 224.

According to some examples, AIF 250 may be located with or supported by a computing device or system equipment managed or operated by Wi-Fi service provider 120. For these examples, although not shown in FIG. 2, AIF 250 may be located with or supported by the same system equipment or computing device that supports H-AAA 124.

In some examples, AIF 250 may be located at a computing device operated by a third party capable of providing interconnection services between Wi-Fi service provider 120 and 3G 3GPP service provider 220. For these examples, the third party may be contracted by both of these types of service providers or other types of service providers for the third party to manage a computing device capable of performing the interworking described above for AIF 250.

Figure 3:
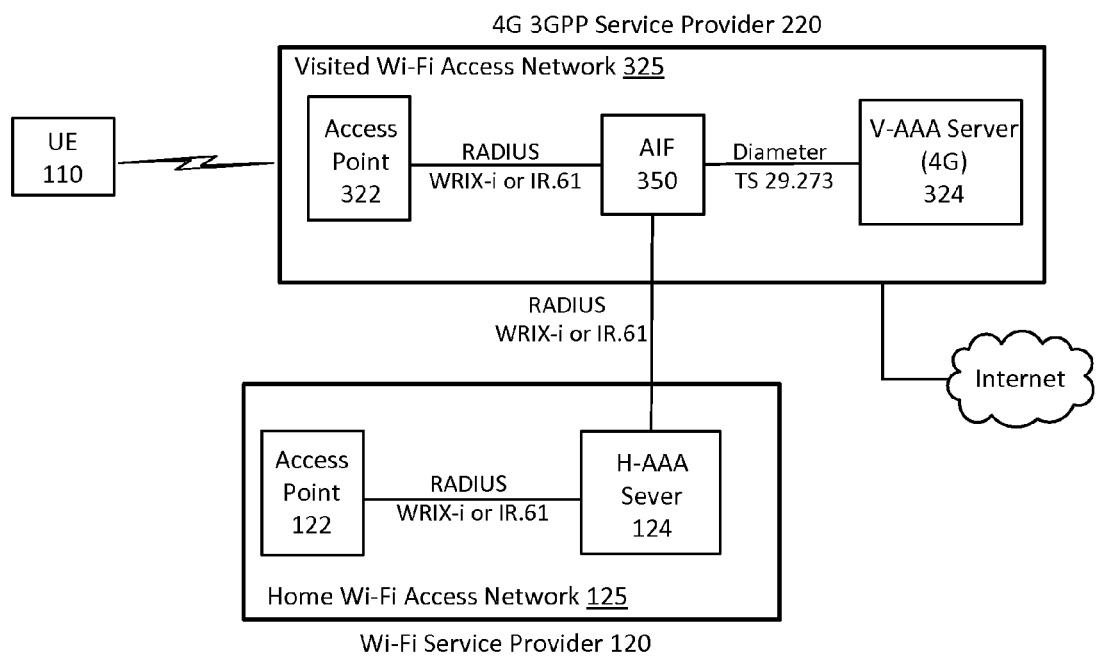
FIG. 3 illustrates an example of a second roaming system.

FIG. 3 illustrates an example of a second roaming system. As shown in FIG. 3, the second roaming system includes roaming system 300. In some examples, as shown in FIG. 3, roaming system 300 includes UE 110 wirelessly coupled to visited Wi-Fi access network 325 operated by 4G 3GPP service provider 320. For these examples, as shown in FIG. 3, Wi-Fi access network 325 includes an access point 322, an AIF 350 and a V-AAA server 324. Also shown in FIG. 3, is home Wi-Fi access network 125 operated by Wi-Fi service provider 120. In some examples, Wi-Fi access network 125 may be considered as a different WLAN and H-AAA 124 may be associated with that different WLAN.

According to some examples, 4G 3GPP service provider 320 may be a type of service provider or network system that in addition to operating visited Wi-Fi access network 325 may also operate cellular-based wireless networks in compliance with 3GPP specifications or standards that include Release 8 and above. Thus 4G 3GPP service provider 320 may be considered as a 4G 3GPP service provider. For these examples, V-AAA server 324 may be located at or with system equipment at a 4G EPC. Hence, V-AAA 324 may be operated as a 4G visited AAA server. As a 4G visited AAA server, V-AAA 324 may have an interface operated in compliance with TS 29.273.

In some examples, UE 110 may send or transmit a request to access visited Wi-Fi access network 325 to access point 322. The request may include a username and a password. For these examples, access point 322 may include an IR.61 or WRIX-i compliant interface and may forward the request towards V-AAA 324 as an authorization request using a first RADIUS protocol. However, V-AAA 224 uses an interface operated in compliance with TS 29.273 that uses a Diameter protocol. Therefore, AIF 350 may include logic and/or features to receive the authorization request sent using the RADIUS protocol from access point 322 and then interwork or translate the authorization request to a Diameter protocol. The translated authorization request may then be forwarded by AIF 350 to V-AAA 324.

According to some examples, 4G 3GPP service provider 320 and Wi-Fi service provider 120 may have a previously established a roaming agreement to allow users to roam and gain access to each other's Wi-Fi access networks. If an agreement has been previously established, V-AAA 324 may generate an authentication request to authenticate UE 110 with its home Wi-Fi access network 125 operated by Wi-Fi service provider 120. For these examples, the authentication request may be forwarded towards H-AAA server 124 using the Diameter protocol. AIF 350 may also include logic and/or features to receive the authentication request sent using the Diameter protocol and then interwork or translate the authentication request to the RADIUS protocol. The translated authentication request may then be forwarded by AIF 350 to H-AAA 124.

In some examples, H-AAA 124 may generate authentication information that indicates whether UE 110 has a valid service agreement with Wi-Fi service provider 120. The authentication information may be forwarded towards V-AAA 324 using the RADIUS protocol. For these examples, AIF 350 may include logic and/or features to receive the authentication information sent using the RADIUS protocol and then interwork or translate the authentication information to the Diameter protocol. The translated authentication information may then be forwarded by AIF 350 to V-AAA 324.

According to some examples, V-AAA 324 may generate grant information based on the received authentication information that originated from H-AAA 124. The grant information may indicate whether UE 110 is to be granted access to visited Wi-Fi access network 325. V-AAA 324 may forward the grant information towards access point 322 using the Diameter protocol. For these examples, AIF 350 may include logic and/or features to receive the grant information sent using the Diameter protocol and then interwork or translate the grant information to the RADIUS protocol. The translated grant information may then be forwarded by AIF 350 to access point 322. Access point 322 may then either grant or deny UE 110 access to visited Wi-Fi access network 325 based on the received grant information.

In some examples, during a period of time UE 110 is accessing visited Wi-Fi access network 325, AIF 350 may also interwork accounting information to be exchanged between V-AAA server 324 and H-AAA server 124. This interworking may include similar translations as described above for authorizing and authenticating UE 110.

In some examples, as shown in FIG. 3, AIF 350 may be located or situated as part of visited Wi-Fi access network 325. As such AIF 350 may be located with system equipment or a computing device managed or operated by 4G 3GPP service provider 320. According to some examples, AIF 350 may be located with or supported by the same system equipment or computing device that supports V-AAA 324.

According to some examples, AIF 350 may be located with or supported by a computing device or system equipment managed or operated by Wi-Fi service provider 120. For these examples, although not shown in FIG. 3, AIF 350 may be located with or supported by the same system equipment or computing device that supports H-AAA 124.

In some examples, AIF 350 may located at a computing device operated by a third party capable of providing interconnection services between Wi-Fi service provider 120 and 4G 3GPP service provider 220.

Figure 4:
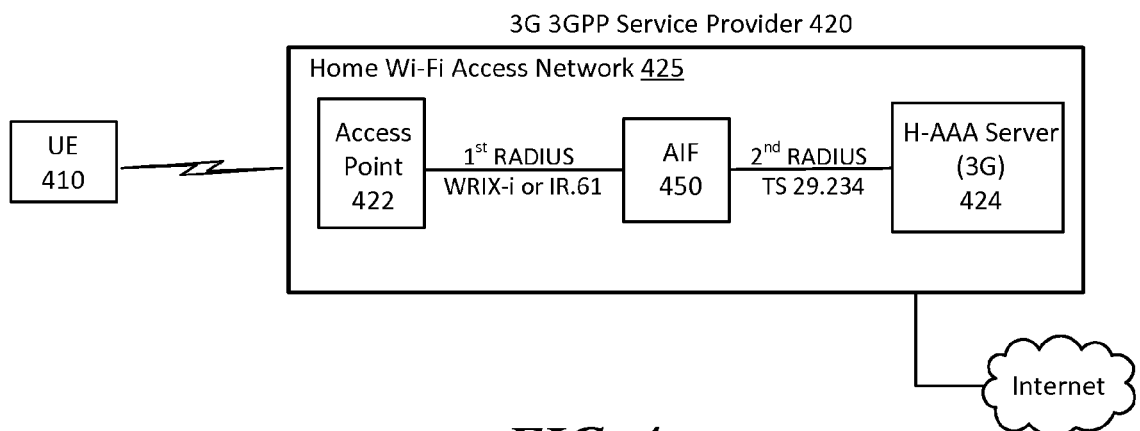
FIG. 4 illustrates an example of a second home system.

FIG. 4 illustrates an example of a second home system. As shown in FIG. 4, the second home system includes home system 400. In some examples, as shown in FIG. 4, home system 400 includes a UE 410 wirelessly coupled to home Wi-Fi access network 425 operated by a 3G 3GPP service provider 420. For these examples, as shown in FIG. 4, home Wi-Fi access network 425 includes an access point 422, an AIF 450 and an H-AAA server 424.

According to some examples, 3G 3GPP service provider 420 may be a type of service provider or network system that in addition to operating home Wi-Fi access network 425 may also operate cellular-based wireless networks in compliance with 3GPP specifications or standards that precede Release 8 and thus may be considered as a 3G 3GPP service provider. For these examples, H-AAA server 424 may be located at or with system equipment at a 3G EPC. Hence, H-AAA 424 may be operated as a 3G home AAA server. As a 3G home AAA server, H-AAA 424 may have an interface operated in compliance with TS 29.234.

In some examples, access point 422 may be arranged or configured to have an IR.61 or a WRIX-i compliant interface and may exchange information with H-AAA 424 using a first RADIUS protocol described in RFC 2865. Meanwhile H-AAA 424 may utilize a second RADIUS protocol described in TS 29.234 to exchange information with access point 422. Therefore, AIF 450 may include logic and/or features capable of providing interworking or translations between the first and second RADIUS protocols.

Figure 5:
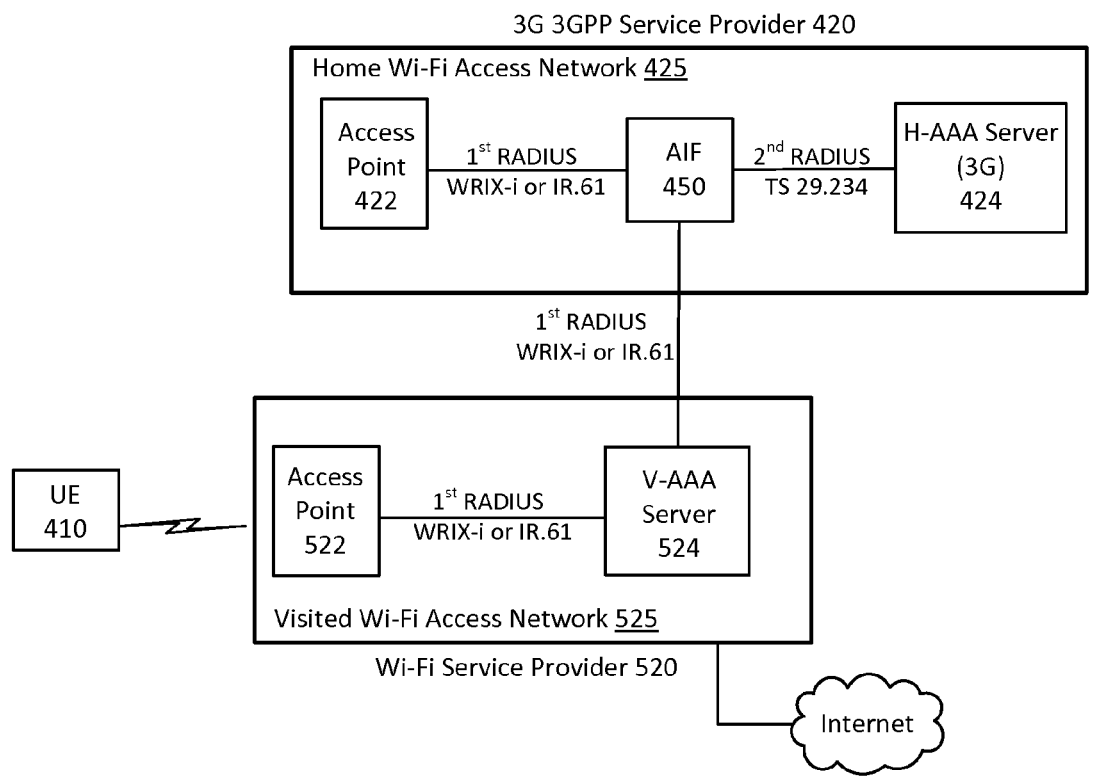
FIG. 5 illustrates an example of a third roaming system.

FIG. 5 illustrates an example of a third roaming system. As shown in FIG. 5, the third roaming system includes roaming system 500. In some examples, as shown in FIG. 5, roaming system 500 includes UE 410 wirelessly coupled to visited Wi-Fi access network 525 operated by Wi-Fi service provider 520. For these examples, as shown in FIG. 5, visited Wi-Fi access network 525 includes an access point 522 and V-AAA server 524. Also shown in FIG. 5, is home Wi-Fi access network 425 operated by 3G 3GPP service provider 420.

According to some examples, Wi-Fi service provider 520 may be a type of service provider or network system that primarily provides Internet access to wireless devices or UEs via Wi-Fi connections (e.g., WISP or MSO).

In some examples, UE 410 may send or transmit a request to access visited Wi-Fi access network 525 to access point 522. The request may include a username and a password. For these examples, access point 522 may include an IR.61 or a WRIX-i compliant interface and may forward the request towards V-AAA 524 as an authorization request using a first RADIUS protocol. According to some examples, 3G 3GPP service provider 420 and Wi-Fi service provider 520 may have a previously established roaming agreement to allow users to roam and gain access to each other's Wi-Fi access networks. If an agreement has been previously established, V-AAA 524 may generate an authentication request to authenticate UE 410 with its home Wi-Fi access network 425 operated by 3G 3GPP service provider 420.

According to some examples, V-AAA 524 may generate the authentication request and then forward the authentication request towards H-AAA 424 using the first RADIUS protocol. V-AAA 524 may also include an IR.61 or a WRIX-i compliant interface and hence also used the first RADIUS protocol. However, as mentioned above, H-AAA 424 uses an interface operated in compliance with TS 29.234. Therefore, AIF 450 may include logic and/or features to receive the authentication request sent using the first RADIUS protocol from V-AAA 524 and then interwork or translate the authentication request to a second RADIUS protocol. The translated authentication request may then be forwarded by AIF 450 to H-AAA 424.

In some examples, H-AAA 424 may generate authentication information that indicates whether UE 410 has a valid service agreement with 3G 3GPP service provider 420. The authentication information may be forwarded towards V-AAA 524 using the second RADIUS protocol. For these examples, AIF 450 may include logic and/or features to receive the authentication information sent using the second RADIUS protocol and then interwork or translate the authentication information to the first RADIUS protocol. The translated authentication information may then be forwarded by AIF 450 to V-AAA 524.

According to some examples, V-AAA 524 may generate grant information based on the received authentication information that originated from H-AAA 424. The grant information may indicate whether UE 410 is to be granted access to visited Wi-Fi access network 525. V-AAA 524 may forward the grant information to access point 522 using the first RADIUS protocol. Access point 522 may then either grant or deny UE 410 access to visited Wi-Fi access network 525 based on the received grant information.

In some examples, during a period of time UE 410 is accessing visited Wi-Fi access network 525, AIF 450 may also interwork accounting information to be exchanged between V-AAA server 524 and H-AAA server 424. This interworking may include similar translations as described above for authorizing and authenticating UE 410.

In some examples, as shown in FIG. 5, AIF 450 may be located or situated as part of home Wi-Fi access network 425. As such AIF 450 may be located with system equipment or a computing device managed or operated by 3G 3GPP service provider 420. According to some examples, AIF 450 may be located with or supported by the same system equipment or computing device that supports H-AAA 424.

In some examples, AIF 450 may located at a computing device operated by a third party capable of providing interconnection services between Wi-Fi service provider 520 and 3G 3GPP service provider 420.

Figure 6:
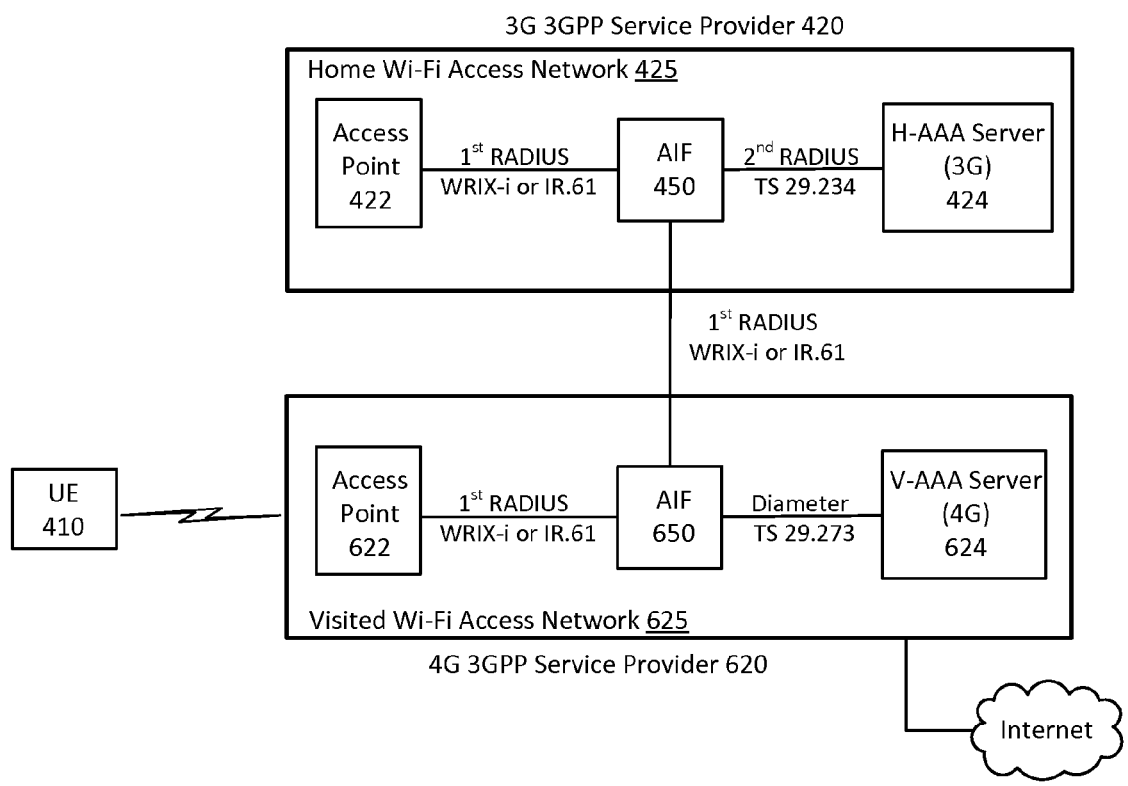
FIG. 6 illustrates an example of a fourth roaming system.

FIG. 6 illustrates an example of a fourth roaming system. As shown in FIG. 6, the fourth roaming system includes roaming system 600. In some examples, as shown in FIG. 6, roaming system 600 includes UE 410 wirelessly coupled to visited Wi-Fi access network 625 operated by 4G 3GPP service provider 620. For these examples, as shown in FIG. 6, Wi-Fi access network 625 includes an access point 622, an AIF 650 and a V-AAA server 624. Also shown in FIG. 6, is home Wi-Fi access network 425 operated by 3G 3GPP service provider 420.

According to some examples, 4G 3GPP service provider 620 may be a type of service provider or network system that in addition to operating visited Wi-Fi access network 625 may also operate cellular-based wireless networks in compliance with 3GPP specifications or standards that include Release 8 and above. Thus 4G 3GPP service provider 620 may be considered as a 4G 3GPP service provider. For these examples, V-AAA server 624 may be located at or with system equipment at a 4G EPC. Hence, V-AAA 624 may be operated as a 4G visited AAA server. As a 4G visited AAA server, V-AAA 624 may have an interface operated in compliance with TS 29.273.

In some examples, UE 410 may send or transmit a request to access visited Wi-Fi access network 625 to access point 622. The request may include a username and a password. For these examples, access point 622 may include an IR.61 or WRIX-i compliant interface and may forward the request towards V-AAA 624 as an authorization request using a first RADIUS protocol. However, V-AAA 624 uses an interface operated in compliance with TS 29.273 that uses a Diameter protocol. Therefore, AIF 650 may include logic and/or features to receive the authorization request sent using the first RADIUS protocol from access point 622 and then interwork or translate the authorization request to a Diameter protocol. The translated authorization request may then be forwarded by AIF 650 to V-AAA 624.

According to some examples, 4G 3GPP service provider 620 and 3G 3GPP service provider 420 may have a previously established a roaming agreement to allow users to roam and gain access to each other's Wi-Fi access networks. If an agreement has been previously established, V-AAA 624 may generate an authentication request to authenticate UE 410 with its home Wi-Fi access network 425 operated by 3G 3GPP service provider 420. For these examples, the authentication request may be forwarded towards H-AAA server 424 using the Diameter protocol. AIF 650 may also include logic and/or features to receive the authentication request sent using the Diameter protocol and then interwork or translate the authentication request to the first RADIUS protocol. The translated authentication request may then be forwarded by AIF 650 towards H-AAA 424.

In some examples, AIF 450 may include logic and/or features to receive the authentication request forwarded by AIF 650 towards H-AAA 424 using the first RADIUS protocol. For these examples, AIF 450 may interwork or translate the authentication request to the second RADIUS protocol due to H-AAA 424 having an interface compliant with TS 29.234.

In some examples, H-AAA 424 may generate authentication information that indicates whether UE 410 has a valid service agreement with 3G 3GPP service provider 420. The authentication information may be forwarded towards V-AAA 624 using the second RADIUS protocol. For these examples, AIF 450 may include logic and/or features to receive the authentication information sent using the second RADIUS protocol and then interwork or translate the authentication information to the first RADIUS protocol. The translated authentication information may then be forwarded by AIF 450 towards V-AAA 624.

According to some examples, AIF 650 may include logic and/or features to receive the authentication information forwarded by AIF 450 towards V-AAA 624 using the first RADIUS protocol. For these examples, AIF 650 may interwork or translate the authentication information to the Diameter protocol. The translated authentication information may then be forwarded by AIF 650 to V-AAA 624.

According to some examples, V-AAA 624 may generate grant information based on the received authentication information that originated from H-AAA 424. The grant information may indicate whether UE 410 is to be granted access to visited Wi-Fi access network 625. V-AAA 624 may forward the grant information towards access point 622 using the Diameter protocol. For these examples, AIF 650 may include logic and/or features to receive the grant information sent using the Diameter protocol and then interwork or translate the grant information to the first RADIUS protocol. The translated grant information may then be forwarded by AIF 650 to access point 622. Access point 622 may then either grant or deny UE 410 access to visited Wi-Fi access network 625 based on the received grant information.

In some examples, during a period of time UE 410 is accessing visited Wi-Fi access network 625, AIF 450 or AIF 650 may also interwork accounting information to be exchanged between V-AAA server 624 and H-AAA server 424. This interworking may include similar translations as described above for authorizing and authenticating UE 410.

In some examples, as shown in FIG. 6, AIF 450 and AIF 650 may be located or situated as part of their respective Wi-Fi access networks. As such AIF 450 may be located with system equipment or a computing device managed or operated by 3G 3GPP service provider 420 and AIF 650 may be located with system equipment or a computing device managed or operated by 4G 3GPP service provider 620. According to some examples, the functionality of both AIF 450 and 650 may be located with or supported by the same system equipment or computing device that supports either H-AAA 424 or supports V-AAA 624.

In some examples, the functionality of just AIF 450 or just AIF 650 or both may located at a computing device operated by a third party capable of providing inter-connection services between 3G 3GPP service provider 420 and 4G 3GPP service provider 620.

Figure 7:
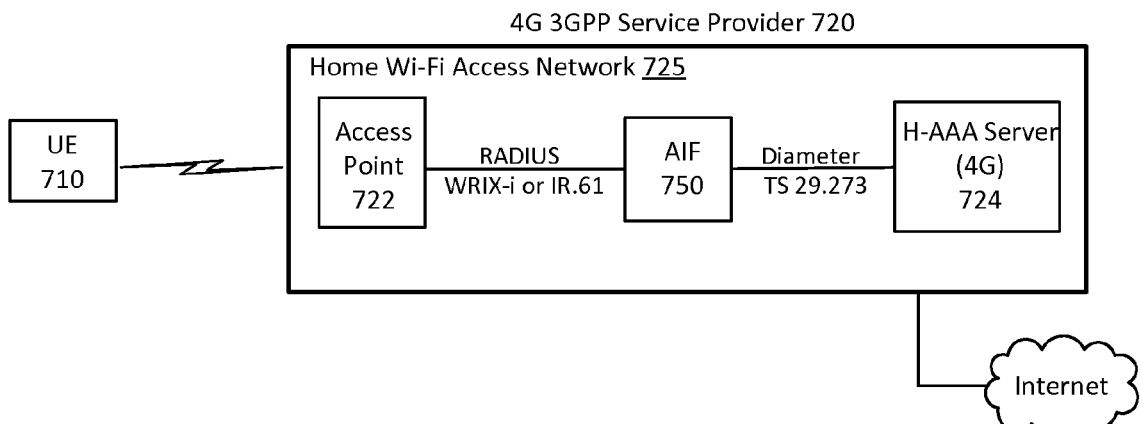
FIG. 7 illustrates an example of a third home system.

FIG. 7 illustrates an example of a third home system. As shown in FIG. 7, the third home system includes home system 700. In some examples, as shown in FIG. 7, home system 700 includes a UE 710 wirelessly coupled to home Wi-Fi access network 725 operated by a 4G 3GPP service provider 720. For these examples, as shown in FIG. 7, home Wi-Fi access network 725 includes an access point 722, an AIF 750 and an H-AAA server 724.

According to some examples, 4G 3GPP service provider 720 may be a type of service provider or network system that in addition to operating home Wi-Fi access network 7425 may also operate cellular-based wireless networks in compliance with 3GPP specifications or standards that include Release 8 and above. Thus 4G 3GPP service provider 720 may be considered as a 4G 3GPP service provider. For these examples, H-AAA server 724 may be located at or with system equipment at a 4G EPC. Hence, H-AAA 724 may be operated as a 4G home AAA server. As a 4G home AAA server, H-AAA 724 may have an interface operated in compliance with TS 29.273.

In some examples, access point 722 may be arranged or configured to have an IR.61 or a WRIX-i compliant interface and may exchange information with H-AAA 724 using a first RADIUS protocol described in RFC 2865. Meanwhile H-AAA 724 may utilize a Diameter protocol described in TS 29.273 to exchange information with access point 722. Therefore, AIF 470 may include logic and/or features capable of providing interworking or translations between the RADIUS and Diameter protocols.

Figure 8:
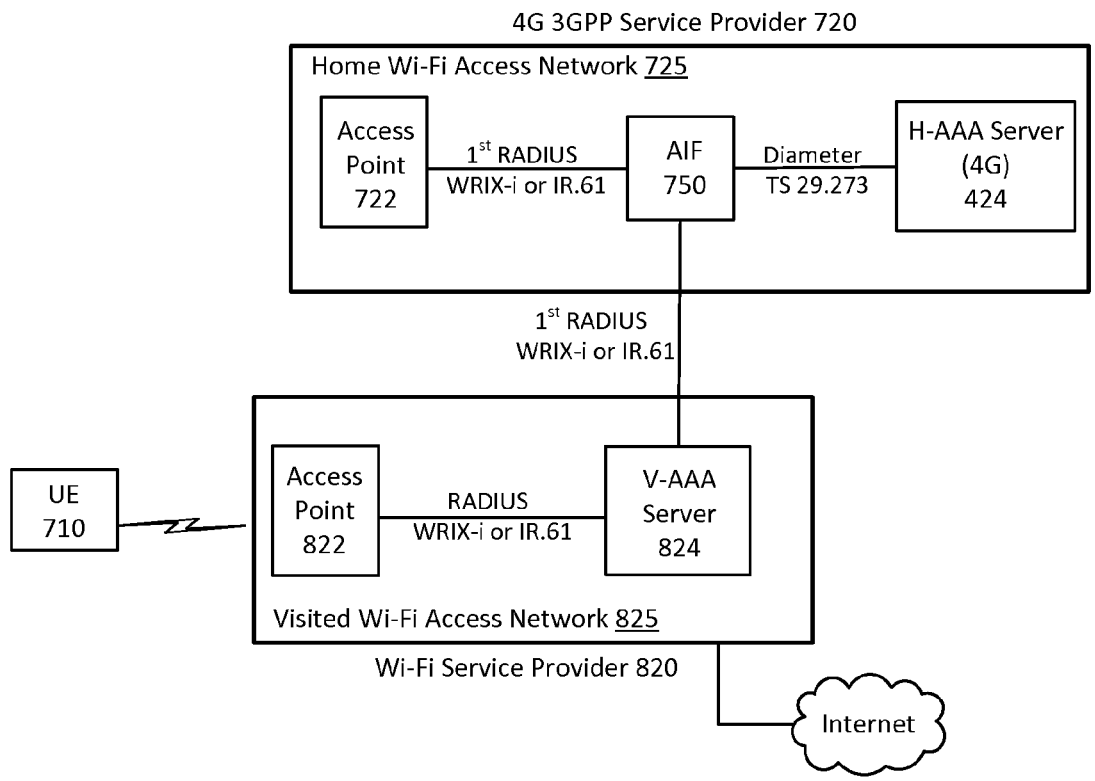
FIG. 8 illustrates an example of a fifth roaming system.

FIG. 8 illustrates an example of a fifth roaming system. As shown in FIG. 8, the fifth roaming system includes roaming system 800. In some examples, as shown in FIG. 8, roaming system 800 includes UE 710 wirelessly coupled to visited Wi-Fi access network 825 operated by Wi-Fi service provider 820. For these examples, as shown in FIG. 8, visited Wi-Fi access network 825 includes an access point 822 and V-AAA server 824. Also shown in FIG. 8, is home Wi-Fi access network 725 operated by 4G 3GPP service provider 720.

According to some examples, Wi-Fi service provider 820 may be a type of service provider or network system that primarily provides Internet access to wireless devices or UEs via Wi-Fi connections (e.g., WISP or MSO).

In some examples, UE 710 may send or transmit a request to access visited Wi-Fi access network 825 to access point 822. The request may include a username and a password. For these examples, access point 822 may include an IR.61 or a WRIX-i compliant interface and may forward the request towards V-AAA 824 as an authorization request using a RADIUS protocol. According to some examples, 4G 3GPP service provider 720 and Wi-Fi service provider 820 may have a previously established roaming agreement to allow users to roam and gain access to each other's Wi-Fi access networks. If an agreement has been previously established, V-AAA 824 may generate an authentication request to authenticate UE 710 with its home Wi-Fi access network 725 operated by 4G 3GPP service provider 720.

According to some examples, V-AAA 824 may generate the authentication request and then forward the authentication request towards H-AAA 724 using the RADIUS protocol. V-AAA 824 may also include an IR.61 or a WRIX-i compliant interface and hence also used the RADIUS protocol. However, as mentioned above, H-AAA 724 uses an interface operated in compliance with TS 29.273. Therefore, AIF 750 may include logic and/or features to receive the authentication request sent using the RADIUS protocol from V-AAA 824 and then interwork or translate the authentication request to a Diameter protocol. The translated authentication request may then be forwarded by AIF 750 to H-AAA 724.

In some examples, H-AAA 724 may generate authentication information that indicates whether UE 710 has a valid service agreement with 4G 3GPP service provider 720. The authentication information may be forwarded towards V-AAA 824 using the Diameter protocol. For these examples, AIF 750 may include logic and/or features to receive the authentication information sent using the Diameter protocol and then interwork or translate the authentication information to the RADIUS protocol. The translated authentication information may then be forwarded by AIF 750 to V-AAA 824.

According to some examples, V-AAA 824 may generate grant information based on the received authentication information that originated from H-AAA 724. The grant information may indicate whether UE 710 is to be granted access to visited Wi-Fi access network 825. V-AAA 824 may forward the grant information to access point 822 using the RADIUS protocol. Access point 822 may then either grant or deny UE 810 access to visited Wi-Fi access network 825 based on the received grant information.

In some examples, during a period of time UE 710 is accessing visited Wi-Fi access network 825, AIF 750 may also interwork accounting information to be exchanged between V-AAA server 824 and H-AAA server 724. This interworking may include similar translations as described above for authorizing and authenticating UE 710.

In some examples, as shown in FIG. 8, AIF 750 may be located or situated to as part of home Wi-Fi access network 725. As such AIF 750 may be located with system equipment or a computing device managed or operated by 4G 3GPP service provider 720. According to some examples, AIF 750 may be located with or supported by the same system equipment or computing device that supports H-AAA 724.

In some examples, AIF 750 may located at a computing device operated by a third party capable of providing inter-connection services between Wi-Fi service provider 820 and 4G 3GPP service provider 720.

Figure 9:
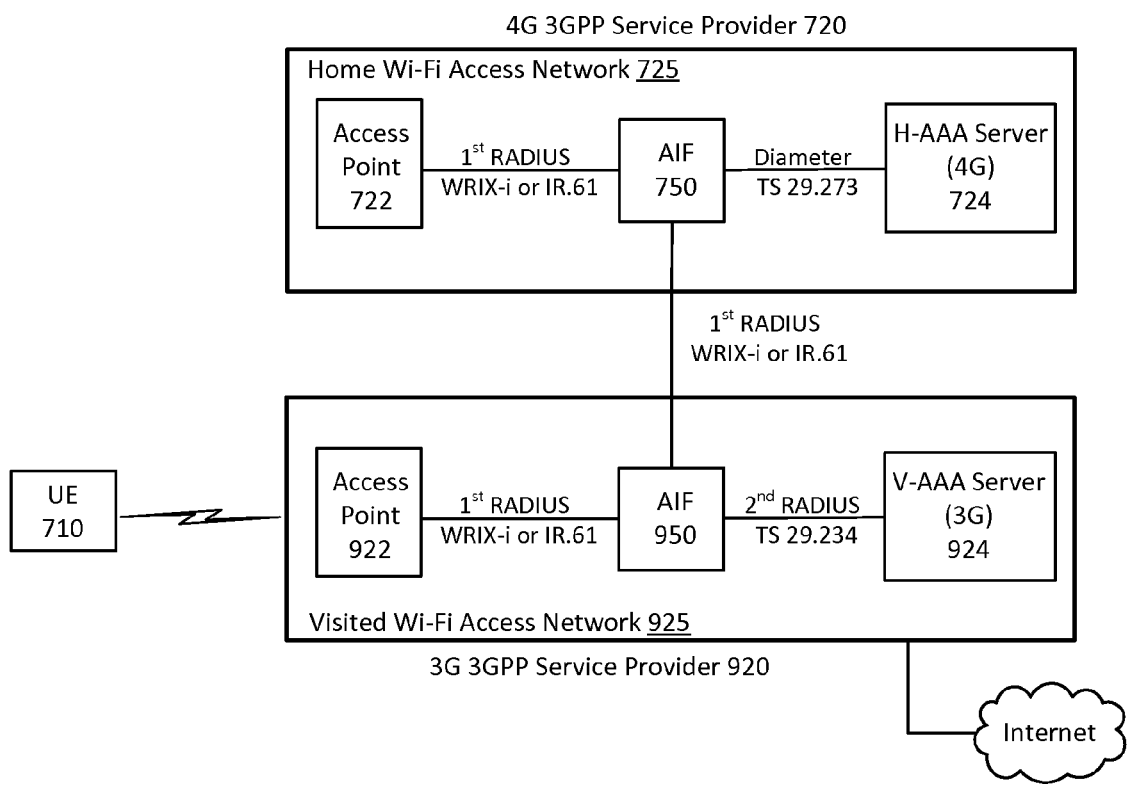
FIG. 9 illustrates an example of a sixth roaming system.

FIG. 9 illustrates an example of a sixth roaming system. As shown in FIG. 9, the sixth roaming system includes roaming system 900. In some examples, as shown in FIG. 9, roaming system 900 includes UE 710 wirelessly coupled to visited Wi-Fi access network 925 operated by 3G 3GPP service provider 920. For these examples, as shown in FIG. 9, Wi-Fi access network 925 includes an access point 922, an AIF 950 and a V-AAA server 924. Also shown in FIG. 9, is home Wi-Fi access network 725 operated by 4G 3GPP service provider 720.

According to some examples, 3G 3GPP service provider 920 may be a type of service provider or network system that in addition to operating visited Wi-Fi access network 925 may also operate cellular-based wireless networks in compliance with 3GPP specifications or standards that precede Release 8 and thus may be considered as a 3G 3GPP service provider. For these examples, V-AAA server 924 may be located at or with system equipment at a 3G EPC. Hence, V-AAA 924 may be operated as a 3G visited AAA server. As a 3G visited AAA server, V-AAA 924 may have an interface operated in compliance with TS 29.234.

In some examples, UE 710 may send or transmit a request to access visited Wi-Fi access network 925 to access point 922. The request may include a username and a password. For these examples, access point 922 may include an IR.61 or WRIX-i compliant interface and may forward the request towards V-AAA 924 as an authorization request using a first RADIUS protocol. However, V-AAA 924 uses an interface operated in compliance with TS 29.234 that uses a second RADIUS protocol. Therefore, AIF 950 may include logic and/or features to receive the authorization request sent using the first RADIUS protocol from access point 922 and then interwork or translate the authorization request to the second RADIUS protocol. The translated authorization request may then be forwarded by AIF 950 to V-AAA 924.

According to some examples, 3G 3GPP service provider 720 and 3G 3GPP service provider 920 may have a previously established a roaming agreement to allow users to roam and gain access to each other's Wi-Fi access networks. If an agreement has been previously established, V-AAA 924 may generate an authentication request to authenticate UE 710 with its home Wi-Fi access network 725 operated by 4G 3GPP service provider 720. For these examples, the authentication request may be forwarded towards H-AAA server 724 using the second RADIUS protocol. AIF 950 may include logic and/or features to receive the authentication request sent using the second RADIUS protocol and then interwork or translate the authentication request to the first RADIUS protocol. The translated authentication request may then be forwarded by AIF 950 towards H-AAA 724.

In some examples, AIF 750 may include logic and/or features to receive the authentication request forwarded by AIF 950 towards H-AAA 724 using the first RADIUS protocol. For these examples, AIF 750 may interwork or translate the authentication request to a Diameter protocol due to H-AAA 724 having an interface compliant with TS 29.273.

In some examples, H-AAA 724 may generate authentication information that indicates whether UE 710 has a valid service agreement with 4G 3GPP service provider 720. The authentication information may be forwarded towards V-AAA 924 using the Diameter protocol. For these examples, AIF 750 may include logic and/or features to receive the authentication information sent using the Diameter protocol and then interwork or translate the authentication information to the first RADIUS protocol. The translated authentication information may then be forwarded by AIF 750 towards V-AAA 924.

According to some examples, AIF 950 may include logic and/or features to receive the authentication information forwarded by AIF 750 towards V-AAA 924 using the first RADIUS protocol. For these examples, AIF 950 may interwork or translate the authentication information to the second RADIUS protocol. The translated authentication information may then be forwarded by AIF 950 to V-AAA 924.

According to some examples, V-AAA 924 may generate grant information based on the received authentication information that originated from H-AAA 724. The grant information may indicate whether UE 710 is to be granted access to visited Wi-Fi access network 925. V-AAA 924 may forward the grant information towards access point 922 using the second RADIUS protocol. For these examples, AIF 950 may include logic and/or features to receive the grant information sent using the second RADIUS protocol and then interwork or translate the grant information to the first RADIUS protocol. The translated grant information may then be forwarded by AIF 950 to access point 922. Access point 922 may then either grant or deny UE 710 access to visited Wi-Fi access network 925 based on the received grant information.

In some examples, during a period of time UE 710 is accessing visited Wi-Fi access network 925, AIF 750 or 950 may also interwork accounting information to be exchanged between V-AAA server 924 and H-AAA server 724. This interworking may include similar translations as described above for authorizing and authenticating UE 710.

In some examples, as shown in FIG. 9, AIF 750 and AIF 950 may be located or situated as part of their respective Wi-Fi access networks. As such AIF 750 may be located with system equipment or a computing device managed or operated by 4G 3GPP service provider 720 and AIF 950 may be located with system equipment or a computing device managed or operated by 3G 3GPP service provider 920. According to some examples, the functionality of both AIF 750 and 950 may be located with or supported by the same system equipment or computing device that supports either H-AAA 724 or supports V-AAA 924.

In some examples, the functionality of just AIF 750 or just AIF 950 or both may located at a computing device operated by a third party capable of providing inter-connection services between 3G 3GPP service provider 920 and 4G 3GPP service provider 720.

Figure 10:
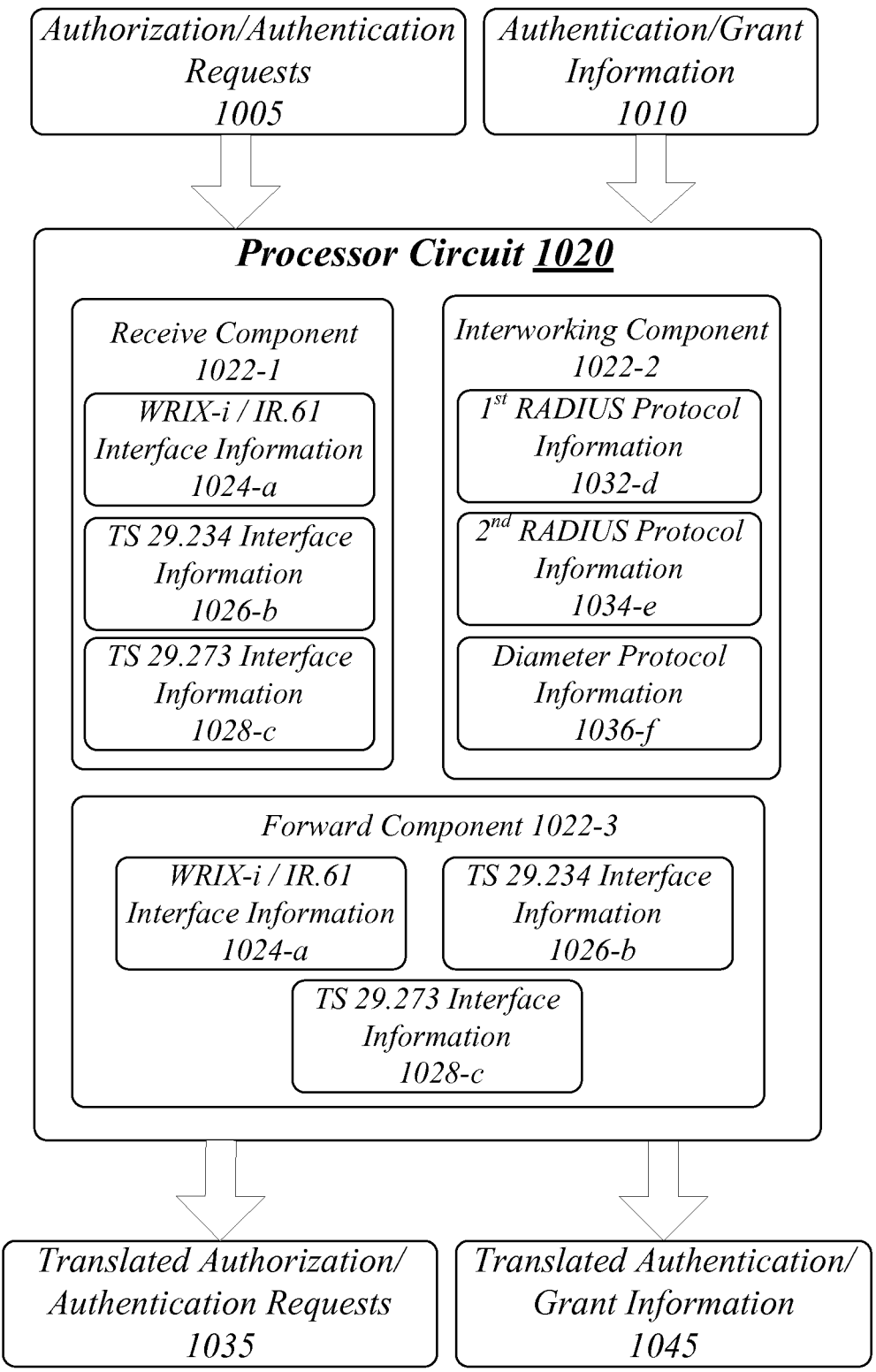
FIG. 10 illustrates an example block diagram for an apparatus.

FIG. 10 illustrates a block diagram for an apparatus 1000. Although apparatus 1000 shown in FIG. 10 has a limited number of elements in a certain topology or configuration, it may be appreciated that apparatus 1000 may include more or less elements in alternate configurations as desired for a given implementation. In some examples, apparatus 1000 may incorporate features of AAA interworking function (AIF) as mentioned above for FIGS. 2-9 (e.g., AIFs 250, 350, 450, 650, 750 or 950).

The apparatus 1000 may comprise a computer-implemented apparatus 1000 having a processor circuit 1020 arranged to execute one or more software components 1022-*a*. It is worthy to note that "a" and "b" and "c" and similar designators as used herein are intended to be variables representing any positive integer. Thus, for example, if an implementation sets a value for a=3, then a complete set of software components 1022-*a* may include components 1022-1, 1022-2 and 1022-3. The embodiments are not limited in this context.

According to some examples, apparatus 1000 may be part of system equipment (e.g., located at or with visiting or home AAA servers), such as network equipment for a communications system or network compliant with one or more 3GPP LTE Specifications or with one or more IEEE 802.11 or 802.1x standards. For example, apparatus 1000 may be implemented as part of a base station or evolved Node B (eNB) for an LTE and/or LTE-A compliant wireless network, system equipment located at an EPC operated by 3G/4G 3GPP service providers, system equipment or servers associated with Wi-Fi service providers. Apparatus 1000 may also be located in third party computing devices that may provide inter-connection services to 3G/4G 3GPP or Wi-Fi service providers.

In some examples, as shown in FIG. 10, apparatus 1000 includes processor circuit 1020. Processor circuit 1020 may be generally arranged to execute one or more software components 1022-*a*. The processor circuit 1020 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 1020. According to some examples processor circuit 1020 may also be an application specific integrated circuit (ASIC) and components 1022-*a* may be implemented as hardware elements of the ASIC.

According to some examples, apparatus 1000 may include a receive component 1022-1. Receive component 1022-1 may be executed by processor circuit 1020 to receive authorization/authentication requests 1005 or authentication/grant information 1010. As mentioned above for the various visited Wi-Fi access networks or WLANs shown in FIGS. 2-9, various requests and information responsive to those requests may be received to enable a UE to access a visited Wi-Fi access network. Receive component 1022-1 may include information associated with various interfaces in order to receive authorization/authentication requests 1005 or authentication/grant information 1010. For example, receive component 1022-1 may include a data structure (e.g., a look up table (LUT)) to maintain WRIX-i/IR.61 interface information 1024-*a*, TS 29.234 interface information 1026-*b* or TS 29.273 information 1028-*c* to facilitate receipt of authorization/authentication requests 1005 or authentication/grant information 1010.

In some examples, apparatus 1000 may also include an interworking component 1022-2. Interworking component 1022-2 may be executed by processor circuit 1020 to interwork received authorization/authentication requests 1005 or authentication/grant information 1010. Interworking the received authorization/authentication requests 1005 or authentication/grant information 1010 may enable the UE seeking access to a visited Wi-Fi access network to be authenticated and authorized for access to the visited Wi-Fi access network. Interworking may include translating the various protocols used to send authorization/authentication requests 1005 or authentication/grant information 1010 between visited and home AAA servers or between visited AAA servers and access points the visited Wi-Fi access network. For example, interworking component 1022-2 may include a data structure (e.g., a LUT) to maintain $1^{st}$ RADIUS protocol information 1032-*d*, $2^{nd}$ RADIUS protocol information 1034-*e* or Diameter protocol information 1036-*f* to facilitate the translating of the various protocols.

In some examples, apparatus 1000 may also include a forward component 1022-3. Forward component 1022-3 may be executed by processor circuit 1020 to forward translated authorization/authentication requests 1035 or translated authentication grant information 1045 to visited AAA servers, home AAA servers or access points for visited Wi-Fi access networks. Forward component 1022-3 may include information associated with various interfaces in order to forward authorization/authentication requests 1035 or translated authentication grant information 1045. For example, forward component 1022-3 may include a data structure (e.g., a look up table (LUT)) to maintain WRIX-i/IR.61 interface information 1024-*a*, TS 29.234 interface information 1026-*b* or TS 29.273 information 1028-*c* to facilitate the forwarding of authorization/authentication requests 1035 or translated authentication grant information 1045.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 11 illustrates an example of a logic flow 1100. Logic flow 1100 may be representative of some or all of the operations executed by one or more logic, features, or devices described herein, such as apparatus 1000. More particularly, logic flow 1100 may be implemented by receive component 1022-1, interworking component 1022-2 or forward component 1022-3.

In the illustrated example shown in FIG. 11, logic flow 1100 at block 1102 may receive an authorization request for a UE to access a visited WLAN, the authorization request may be received using a first RADIUS protocol for a WRIX-i or IR.61 interface. For these examples, the authorization request may be included in authorization/authentication requests 1005 and received by receive component 1022-1. The authorization request, for example, may have been forwarded from an access point of the visited WLAN having a WRIX-I or IR.61 interface and using the first RADIUS protocol.

According to some examples, logic flow 1100 at block 1104 may interwork the authorization request for the UE to access the visited WLAN via an AIF. Also at block 1102, interworking via the AIF by logic flow 1100 may include the AIF to authenticate and authorize the UE for access to the visited WLAN via information received from a visited AAA server and information received from a home AAA server. For these examples, interworking component 1022-2 may interwork the authentication request received using the first RADIUS protocol to either a second RADIUS protocol or a to a Diameter protocol depending on whether the visited AAA server and/or the home AAA server are operated by 3G 3GPP or 4G 3GPP service providers.

In some examples, logic flow 1100 at block 1106 may forward the authorization request to the visited AAA server or forward an authentication request to the home AAA server. For these examples, forward module 1022-3 may forward an authentication request if the visited Wi-Fi access network is operated by a 3G or 4G 3GPP service provider or forward an authentication request if the visited Wi-Fi access network is operated by a Wi-Fi access network. If the authorization request is forwarded, interworking module 1022-2 may have translated the authorization request from the first RADIUS protocol to either the second RADIUS protocol (for 3G 3GPP service providers) or the Diameter protocol (for 4G 3GPP service providers).

According to some examples, additional requests and/or information may be received, interworked and forwarded until the UE is either granted or denied access to the visited Wi-Fi access network. The additional requests and/or information may occur as described above for FIGS. 2-9. This disclosure is not limited to only the processes mentioned above in FIGS. 2-9 to authenticate and authorize the UE for access to the visited Wi-Fi access network.

FIG. 12 illustrates an embodiment of a storage medium 1200. Storage medium 1200 may comprise an article of manufacture. In some examples, storage medium 1200 may include any non-transitory computer readable medium or machine readable medium, such as an optical, magnetic or semiconductor storage. Storage medium 1200 may store various types of computer executable instructions, such as instructions to implement logic flow 1100. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
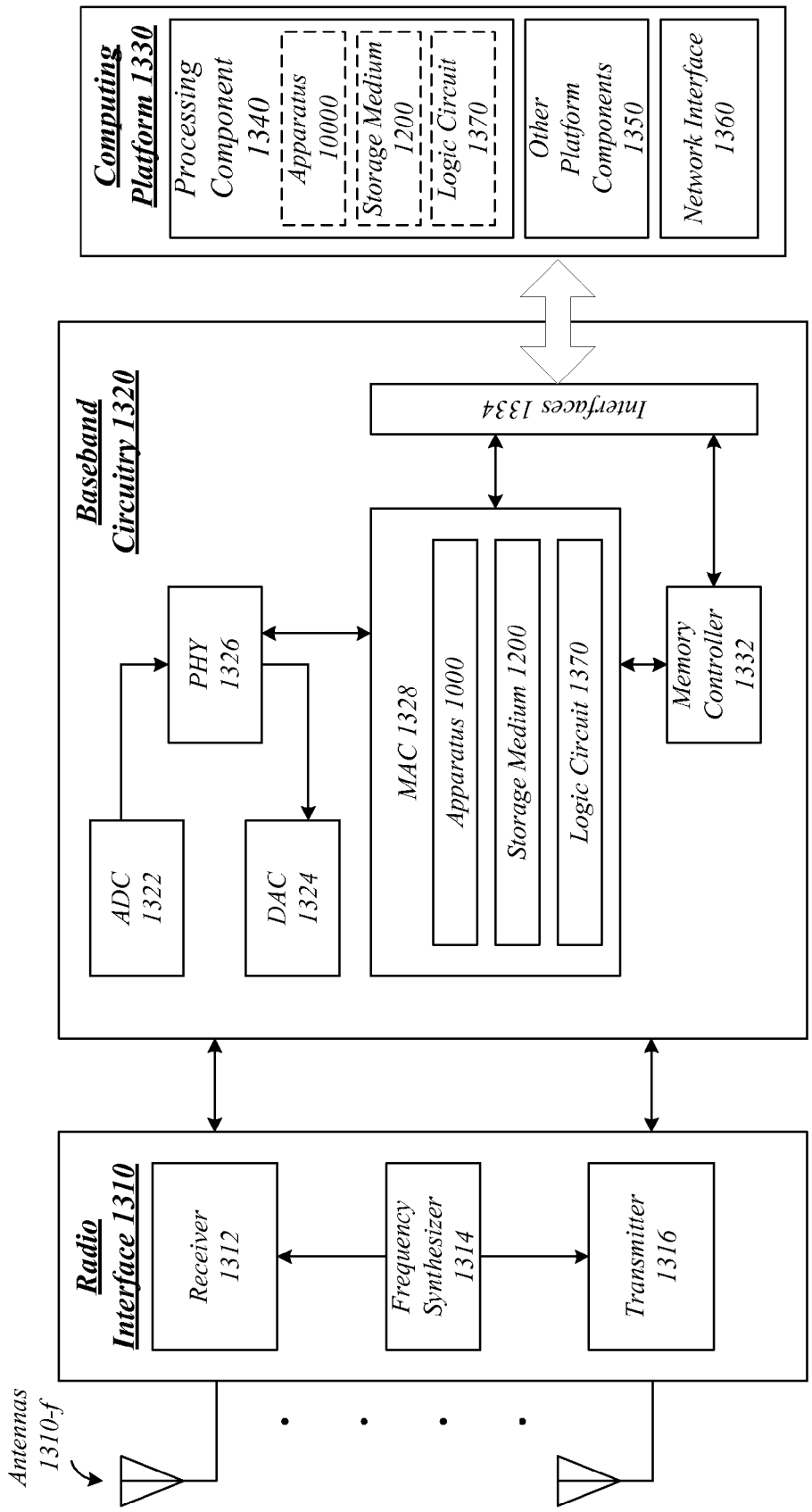
FIG. 13 illustrates an example of a device.

FIG. 13 illustrates an embodiment of a device 1300. In some examples, device 1300 may be configured or arranged for wireless communications in a wireless network. Device 1300 may implement, for example, apparatus 1000, storage medium 1200 and/or a logic circuit 1370. The logic circuit 1370 may include physical circuits to perform operations described for apparatus 1000. As shown in FIG. 13, device 1300 may include a radio interface 1310, baseband circuitry 1320, and computing platform 1330, although examples are not limited to this configuration.

The device 1300 may implement some or all of the structure and/or operations for apparatus 1000, storage medium 1200 and/or logic circuit 1370 in a single computing entity, such as entirely within a single device. The embodiments are not limited in this context.

In one example, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318-$f$. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1326 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with MAC processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames (e.g., containing subframes). Alternatively or in addition, MAC processing circuit 1328 may share processing for certain of these functions or perform these processes independent of PHY processing circuit 1326. In some embodiments, MAC and PHY processing may be integrated into a single circuit.

Computing platform 1330 may provide computing functionality for device 1300. As shown, computing platform 1330 may include a processing component 1340. In addition to, or alternatively of, baseband circuitry 1320 of device 1300 may execute processing operations or logic for apparatus 10000, storage medium 1200, and logic circuit 1370 using the processing component 1330. Processing component 1340 (and/or PHY 1326 and/or MAC 1328) may comprise various hardware elements, software elements, or a combination of both. Examples of hardware elements may include devices, logic devices, components, processors, microprocessors, circuits, processor circuits (e.g., processor circuit 1320), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1330 may further include a network interface 1360. In some examples, network interface 1360 may include logic and/or features to support network interfaces operated in compliance with one or more wireless broadband technologies such as those described in one or more standards associated with 3G 3GPP, 4G 3GPP, IEEE 802.11 or IEEE 802.1x.

Device 1300 may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated with broadband wireless technologies to include 3G 3GPP, 4G 3GPP, IEEE 802.11 or IEEE 802.1x, although the examples are not limited in this respect.

Embodiments of device 1300 may be implemented using single input single output (SISO) architectures. However, certain implementations may include multiple antennas (e.g., antennas 1318-*f*) for transmission and/or reception using adaptive antenna techniques for beamforming or spatial division multiple access (SDMA) and/or using multiple input multiple output (MIMO) communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    a processor circuit;
    a receive component to be executed by the processor circuit to receive, from an access point of a wireless local area network (WLAN) operated by a wireless cellular service provider, a first authorization request for user equipment (UE) to access the WLAN operated by the wireless cellular service provider, the first authorization request received from the access point using a first remote authentication dial in user service (RADIUS) protocol for a wireless roaming intermediary exchange-interconnect (WRIX-i) or international roaming.61 (IR.61) interface;

an interworking component to be executed by the processor circuit to interwork the first authorization request for forwarding to a first authentication, authorization and accounting (AAA) server via an AAA interworking function (AIF), the first AAA server operated by the wireless cellular service provider; and a forwarding component to be executed by the processor circuit to forward the interworked first authorization request to the first AAA server.

2. The apparatus of claim 1, the WLAN to comprise a Wi-Fi access network.

3. The apparatus of claim 1, the UE configured to access the WLAN via a username and password or access a wireless wide area network (WWAN) associated with the first AAA server via subscriber identity module (SIM) or universal SIM (USIM) credentials.

4. The apparatus of claim 1, comprising:
static random access memory (SRAM) to at least temporarily maintain information associated with receiving the first authorization request using the first RADIUS protocol.

5. A method comprising:
receiving, at a computing device, a first authorization request for user equipment (UE) to access a wireless local area network (WLAN) operated by a wireless cellular service provider, the first authorization request received from an access point of the WLAN using a first remote authentication dial in user service (RADIUS) protocol for a wireless roaming intermediary exchange-interconnect (WRIX-i) or international roaming.61 (IR.61) interface;

interworking the first authorization request for forwarding to a first authentication, authorization and accounting (AAA) server via an AAA interworking function (AIF), the first AAA server operated by the wireless cellular service provider; and forwarding the interworked first authorization request to the first AAA server.

6. The method of claim 5, the UE configured to access the WLAN via a username and password or access a wireless wide area network (WWAN) associated with the first AAA server via subscriber identity module (SIM) or universal SIM (USIM) credentials.

7. The method of claim 5, the WLAN to comprise a Wi-Fi access network.

8. At least one non-transitory machine readable medium comprising a plurality of instructions that in response to being executed on a system cause the system to:
receive, from an access point of a wireless local area network (WLAN) operated by a wireless cellular service provider, a first authorization request for user equipment (UE) to access the WLAN operated by the wireless cellular service provider, the first authorization request received from the access point using a first remote authentication dial in user service (RADIUS) protocol for a wireless roaming intermediary exchange-interconnect WRIX-i or international roaming.61 (IR.61) interface;

interwork the first authorization request for forwarding to a first authentication, authorization and accounting (AAA) server AAA interworking function (AIF), the first AAA server operated by the wireless cellular service provider; and forward the interworked first authorization request to the first AAA server.

9. The at least one non-transitory machine readable medium of claim 8, the WLAN to comprise a Wi-Fi access network.

10. The apparatus of claim 1, the wireless cellular service provider comprising a third-generation (3G) 3rd Generation Partnership Project (3GPP) service provider, the interworking of the first authorization request to comprise translating the first authorization request from the first RADIUS protocol to a second RADIUS protocol for forwarding to the first AAA server operated by the 3G 3GPP service provider, the receive component to be executed by the processor circuit to receive a second authorization request from the first AAA server using the second RADIUS protocol, the interworking component to interwork the second authorization request for forwarding to a second AAA server using the first RADIUS protocol.

11. The apparatus of claim 10, the second AAA server operated by a Wi-Fi service provider.

12. The apparatus of claim 10, the second AAA server operated by a fourth-generation (4G) 3GPP service provider.

13. The apparatus of claim 1, the wireless cellular service provider comprising a fourth-generation (4G) 3rd Generation Partnership Project (3GPP) service provider, the interworking of the first authorization request to comprise translating the first authorization request from the first RADIUS protocol to a Diameter protocol for forwarding to the first AAA server operated by the 4G 3GPP service provider, the receive component to be executed by the processor circuit to receive a second authorization request from the first AAA server using the Diameter protocol, the interworking component to interwork the second authorization request for forwarding to a second AAA server using the first RADIUS protocol.

14. The apparatus of claim 13, the second AAA server operated by a Wi-Fi service provider.

15. The apparatus of claim 13, the second AAA server operated by a third-generation (3G) 3GPP service provider.

16. The method of claim 5, the wireless cellular service provider comprising a third-generation (3G) 3rd Generation Partnership Project (3GPP) service provider, the interworking of the first authorization request to comprise translating the first authorization request from the first RADIUS protocol to a second RADIUS protocol for forwarding to the first AAA server operated by the 3G 3GPP service provider, the method comprising:
receiving a second authorization request from the first AAA server using the second RADIUS protocol; and
interworking the second authorization request for forwarding to a second AAA server using the first RADIUS protocol.

17. The method of claim 16, the second AAA server operated by a Wi-Fi service provider.

18. The method of claim 16, the second AAA server operated by a fourth-generation (4G) 3GPP service provider.

19. The method of claim 5, the wireless cellular service provider comprising a fourth-generation (4G) 3rd Generation Partnership Project (3GPP) service provider, the interworking of the first authorization request to comprise translating the first authorization request from the first RADIUS protocol to a Diameter protocol for forwarding to the first AAA server operated by the 4G 3GPP service provider, the method comprising:

receiving a second authorization request from the first AAA server using the Diameter protocol; and interworking the second authorization request for forwarding to a second AAA server using the first RADIUS protocol.

20. The method of claim 19, the second AAA server operated by a Wi-Fi service provider.

21. The method of claim 19, the second AAA server operated by a third-generation (3G) 3GPP service provider.

22. The at least one non-transitory machine readable medium of claim 8, the wireless cellular service provider comprising a third-generation (3G) 3rd Generation Partnership Project (3GPP) service provider, the interworking of the first authorization request to comprise translating the first authorization request from the first RADIUS protocol to a second RADIUS protocol for forwarding to the first AAA server operated by the 3G 3GPP service provider, the at least one non-transitory machine readable medium comprising instructions that, in response to being executed on the system, cause the system to:

receive a second authorization request from the first AAA server using the second RADIUS protocol; and interwork the second authorization request for forwarding to a second AAA server using the first RADIUS protocol.

23. The at least one non-transitory machine readable medium of claim 8, the wireless cellular service provider comprising a fourth-generation (4G) 3rd Generation Partnership Project (3GPP) service provider, the interworking of the first authorization request to comprise translating the first authorization request from the first RADIUS protocol to a Diameter protocol for forwarding to the first AAA server operated by the 4G 3GPP service provider, the at least one non-transitory machine readable medium comprising instructions that, in response to being executed on the system, cause the system to:

receive a second authorization request from the first AAA server using the Diameter protocol; and interwork the second authorization request for forwarding to a second AAA server using the first RADIUS protocol.

24. The at least one non-transitory machine readable medium of claim 23, the second AAA server operated by a Wi-Fi service provider or a third-generation (3G) 3GPP service provider.

* * * * *